ITED STATES PATENT [19]

Lecomte et al.

[11] 3,873,120

[45] Mar. 25, 1975

[54] MODULAR FRAME ASSEMBLY FOR VEHICLE

[75] Inventors: Camille Lecomte, Rueil-Malmaison; André Desirat, Boulogne-Billancourt, both of France

[73] Assignee: Societe Anonyme de Vehicules Industries et d'Equipement Mechanique Saviem, Suresnes, France

[22] Filed: Dec. 21, 1973

[21] Appl. No.: 427,273

[30] Foreign Application Priority Data
Jan. 5, 1973 France .............................. 73.00416

[52] U.S. Cl.............................................. 280/106 R
[51] Int. Cl.............................................. B62d 21/00
[58] Field of Search ................................... 280/106

[56] References Cited
UNITED STATES PATENTS
2,072,044 2/1937 Widman......................... 280/106 R
2,555,556 6/1951 Panzegran................... 280/106 R X Primary Examiner—Philip Goodman

[57] ABSTRACT

A frame for a load-carrying vehicle is constructed from a front sub-assembly and a rear load-carrying sub-assembly adapted to be assembled thereto in different configurations to provide a vehicle having either a high or low load-carrying surface depending upon the assembled configuration. The front sub-assembly includes at least two longitudinally extending structural beams having upper and lower bearing surfaces thereon, and the load-carrying sub-assembly includes a like number of longitudinally extending structural beams having bearing surfaces thereon adapted to cooperate with the upper and the lower bearing surfaces, respectively, on the front sub-assembly to produce a vehicle with a high or low load-carrying surface.

7 Claims, 7 Drawing Figures

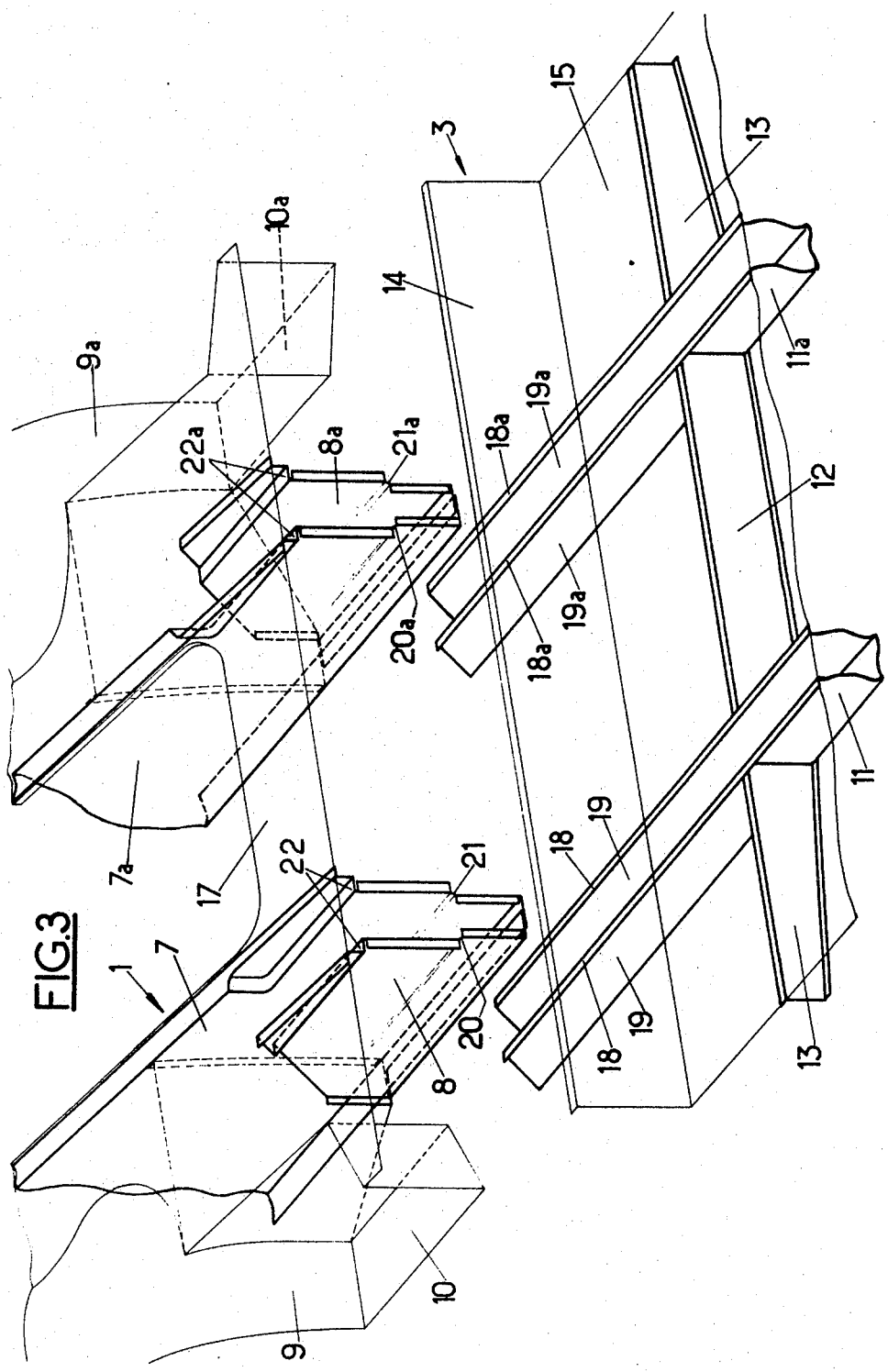

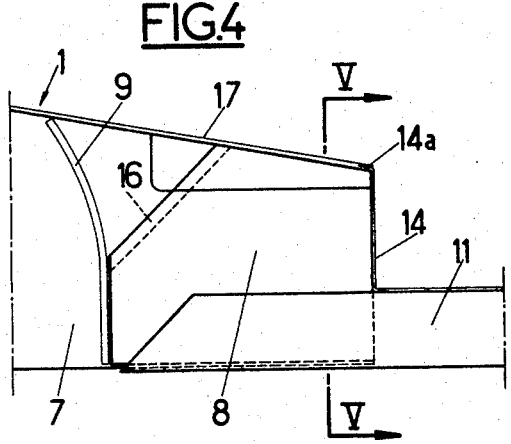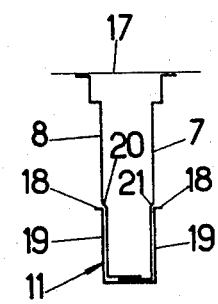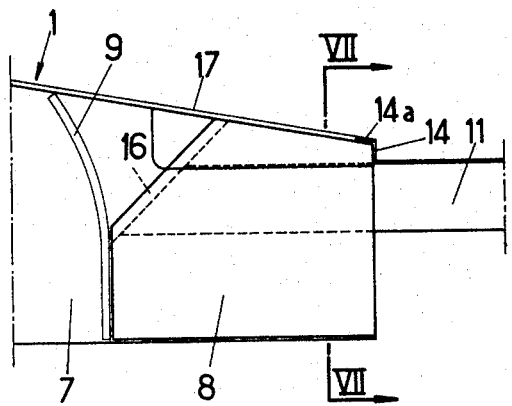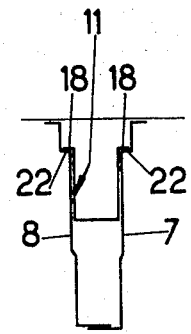

MODULAR FRAME ASSEMBLY FOR VEHICLE

BACKGROUND OF THE INVENTION

1. Field of the Invention

The present invention relates to an arrangement for assembly and use as part of a utility vehicle.

In the case of a delivery vehicle where the engine as well as the transmission are located at the front of the vehicle, it is particularly advantageous to have a load-carrying surface near the ground [i.e., a relatively low load-carrying surface] for the purpose of reducing the work in handling the load.

On the other hand, a utility vehicle for use on a road or a site, usually has a back-axle drive system. The encumberance of the transmission elements of the drive system necessitates the use of a relatively high load-carrying surface.

SUMMARY OF THE INVENTION

The invention resides in the idea of making from two construction modules a utility vehicle, having a loading surface which can have one of two different heights according to the mode of assembling the modules.

The present invention provides an arrangement for a loading surface for a utility vehicle which includes a structural element in front of a cab carrier, a floor forming a load-carrying surface, at least two longitudinal beams carrying the said surface and at least two structural longitudinal beams fixed to the front structure. The said longitudinal beams carrying the load-carrying surface have two substantially horizontal extensions and the ends of said structural beams have two bearing surfaces each able to co-operate either one or the other with one of the said substantially horizontal surfaces whereby there can be formed an assembly in a high or low position for the loading surface.

The invention enables the production on an assembly line from common modules, a vehicle where the height of a floor providing a load-carrying surface is adapted to the use of the vehicle.

BRIEF DESCRIPTION OF THE DRAWINGS

The invention is further described below by way of example with reference to the accompanying drawings, in which:

FIG. 3 is a perspective exploded view of one arrangement according to the invention;

FIG. 4 is an elevation of the arrangement shown in FIG. 3, the arrangement having been assembled and forming part of the vehicle shown in FIG. 1;

FIG. 5 is a cross-section taken along line V—V of FIG. 4;

FIG. 6 is an elevation of a modification of the arrangement shown in FIG. 3, the arrangement having been assembled and forming part of the vehicle shown in FIG. 2; and FIG. 7 is a cross-section taken along line VII—VII of FIG. 6.

DESCRIPTION OF THE PREFERRED EMBODIMENTS

Figure 1:
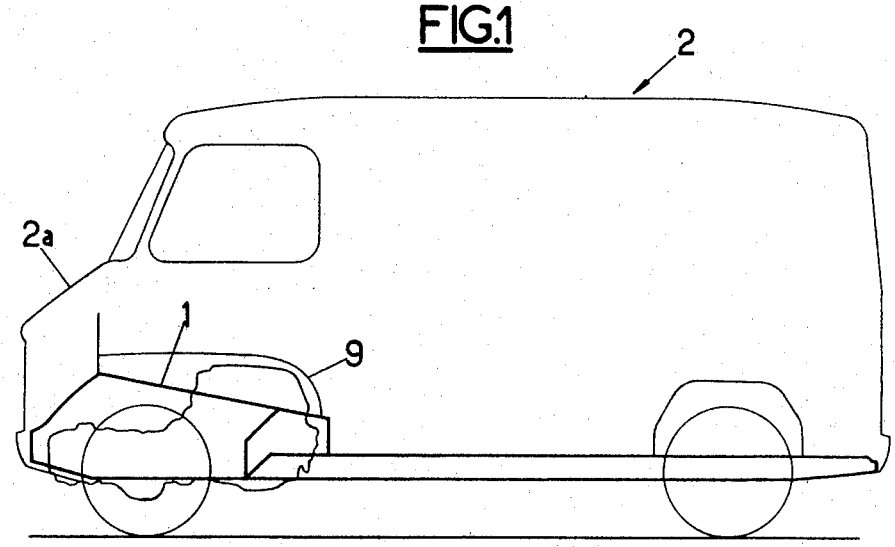
FIG. 1 is an elevation of a utility vehicle having a relatively low loading surface.

A utility vehicle 2 with a relatively low load-carrying surface is shown in FIG. 1. As shown in FIG. 1, the vehicle comprises a front structure 1 which forms an under-frame of a cab 2a.

Referring to FIG. 3, the front structure 1 includes two longitudinal structural beams 7 and 7a and two connecting brackets 8 and 8a connected to the longitudinal beams 7 and 7a so as to form two guides. Several transverse members not shown connect the longitudinal structural beams 7 and 7a. The front structure also comprises mud-guards 9 and 9a and runners 10 and 10a.

A floor structure or load-carrying structure 3 of the vehicle comprises two "U" section longitudinal beams 11 and 11a joined by transverse members 12, only one of which is shown. The beams 11 and 11a each have two vertical webs or arms 19 and 19a between which is an interior longitudinal channel. The floor structure 3 also comprises a loading platform 15, a connecting transverse member 14 and lateral transverse members 13, only one of which is shown. The upper surface of the loading platform 15 constitutes a load-carrying surface. The beams 11 and 11a have horizontal flanges or extensions 18 and 18a. It should be noted that the lateral transverse members 13 are not necessary when the loading platform 15 is replaced by a profiled member or closing sheet for the longitudinal beams 11 and 11a particularly in the case of a cab chassis.

The assembly of the front structure 1 and the floor structure 3 is carried out as follows. The floor structure 3 being fixed, the front structure 1 is lowered by means of a winch so as to introduce the ends of the structural beams 7 and 7a the brackets 8 and 8a into the channel of the longitudinal beams 11 and 11a until the horizontal flanges 18 and 18a of the vertical arms 19 and 19a come into contact with edges 20 and 20a of the brackets 8 and 8a and edges 21, 21a of lateral walls of the structural beams 7 and 7a as can be seen particularly in FIG. 5.

With more particular reference to FIGS. 4 and 5, it can be seen that the ends of the structural beams 7 and 7a and the brackets 8 and 8a form guides whose internal cross-section is reduced so as to be able to be introduced into the channel of the U section beams 11 and 11a. The front structure 1 is then displaced horizontally and rearwardly until the rear ends of the beams 7 and 7a and the brackets 8 and 8a bear against the connecting transverse member 14 and pass under the upper edge 14a of the transverse member 14.

The front structure and the loading surface 15 are thus correctly located relative to each other and can then be connected together by any convenient method [e.g., bolting or welding]. The structural beams 7 and 7a and their respective brackets 8 and 8a are then closed in by a sheet 16 and a floor 17 of the cab 2a.

Figure 2:
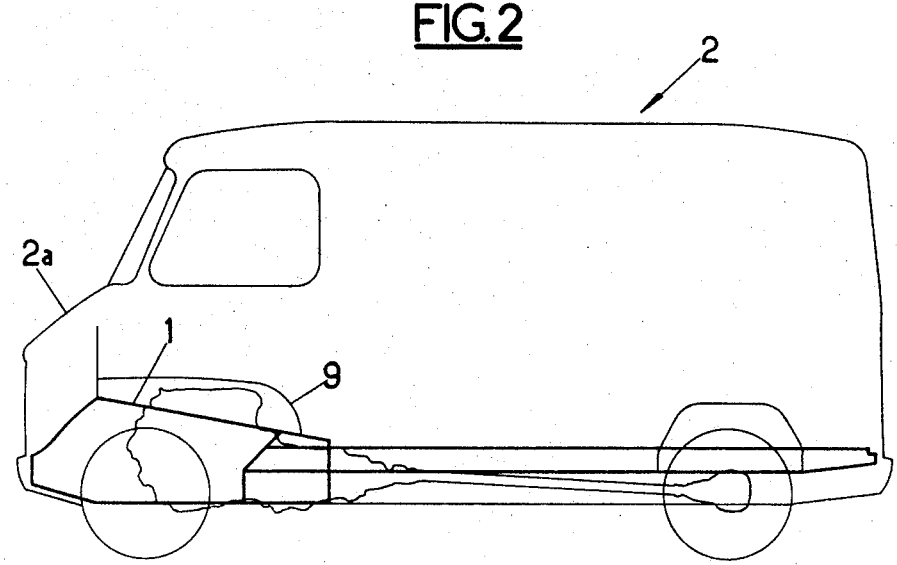
FIG. 2 is an elevation of a utility vehicle having a relatively high loading surface.

A vehicle 2 with a relatively high load-carrying surface is shown in FIG. 2. As shown in FIG. 2, the vehicle comprises a front structure 1 which forms a sub-structure of a cab 2a.

The front structure 1 is as shown in FIG. 3 and includes two longitudinal beams 7 and 7a, two connecting brackets 8 and 8a connected to the beams 7 and 7a so as to form two guides. Several transverse members not shown connect the beams 7 and 7a.

A floor structure 3 which forms the loading surface of the vehicle is like that shown in FIG. 3 except that the height of the transverse member 14 is less than shown in FIG. 3. The height of the transverse member 14 can be seen from FIG. 6. After assembly of the front structure 1 and the floor structure 3, the transverse member 14 co-operates with the rear of the structural beams 7 and 7a and with the brackets 8 and 8a.

The assembly of the front structure 1 and the floor structure 3 is carried out as follows. The front structure 1 being fixed, the floor structure 3 is lowered with the aid of a winch, whereby the ends of the beams 11 and 11a of the floor structure 3 are introduced into the interior of the guides formed by the brackets 8 and 8a and the end portions of the beams 7 and 7a of the front structure 1.

The guides formed by the assembly brackets 8 and 8a and the structural beams 7 and 7a have upper bearing surfaces 22 and 22a on which are supported the horizontal extensions 18 and 18a of the beams 11 and 11a of the loading platform 15.

With particular reference to FIGS. 6 and 7, it can be seen that the floor structure 3 is displaced horizontally and rearwardly into the front structure 1 until the connecting transverse member 14 bears against the rear ends of the beams 7 and 7a and the brackets 8 and 8a.

The front structure 1 and the loading platform 15 are then correctly located relative to each other and can then be connected together by any convenient method [e.g., bolting or welding]. The beams 7, 7a and their respective brackets 8 and 8a are then closed in by a sheet 16 and the floor 17 of the cab 2a.

Whilst the invention has been described with reference to an embodiment in which the longitudinal beams 11 and 11a of the floor structure have a U section with horizontal extensions 18 and 18a so as to co-operate with the guides formed by the ends of beams 7 and 7a and their respective brackets 8 and 8a, it should be understood that the invention is not limited by this particular embodiment.

Longitudinal bearing beams having a "Z" cross-section presenting horizontal arms adapted to co-operate with the bearing surfaces fixed on the ends of the structural beams 7 and 7a, could be used instead of the U section beams. In such an embodiment, the brackets 8 and 8a could be omitted.

What we claim is:

1. A frame assembly for use as part of a utility vehicle comprising a front sub-assembly having at least two structural beams each having upper and lower bearing surfaces thereon, and a load-carrying sub-assembly adapted to be rigidly assembled to said front sub-assembly to define said frame, said load-carrying sub-assembly having at least two longitudinal bearing beams each including a first substantially horizontal extension bearing into said upper bearing surface of said structural beams of said front sub-assembly to locate said load-carrying structure in a relatively high position and a second substantially horizontal extension onto which bear said lower bearing surface of said structural beams of said front sub-assembly to locate said load-carrying structure in a relatively low position.

2. A frame assembly for use as part of a utility vehicle comprising in combination, a front sub-assembly having at least two structural beams each having upper and lower bearing surfaces thereon, and a load-carrying sub-assembly adapted to be rigidly assembled to said front sub-assembly to define said frame, said load-carrying sub-assembly having at least two longitudinal bearing beams each having two substantially vertical arms each having a substantially horizontal extension thereon at its upper extremity, said extensions being capable of co-operating with said upper bearing surfaces to locate said load-carrying sub-assembly in a relatively high position and of co-operating with said lower bearing surface to locate said load-carrying structure in a relatively low position, said arms being adapted to engage and co-operating with lateral walls of the structural beams to assist in locating the load-carrying structure when the load-carrying structure is either in its relatively high or its relatively low position.

3. The frame assembly as claimed in claim 2, wherein each structural beam comprises a portion in the form of a guide, said bearing beams being adapted to co-operate with internal surfaces of said guides when said load-carrying sub-assembly is in its relatively high position and with external surfaces of said guides when said load-carrying sub-assembly is in its relatively low position.

4. The frame assembly as claimed in claim 3, wherein said upper bearing surfaces are surfaces of upper parts of said guides.

5. The frame assembly as claimed in claim 3 wherein each said guide has a lower part and an upper part, said lower part having a smaller cross section than the upper part, each said lower part being engaged between said two substantially vertical arms of one of said bearing beams when said load-carrying sub-assembly is in its relatively low position.

6. A method of assembling frame structures for utility vehicles comprising the steps of constructing the front portion of each frame as a pre-assembled structural module including at least two longitudinally extending structural beams each having upper and lower bearing surfaces, constructing the rear load-carrying portion of each frame as a pre-assembled structural module including a like number of longitudinally extending structural beams each having bearing surfaces thereon adapted to engage and co-operate with said upper bearing surfaces to locate said load-carrying module in a high position relative to said front module or alternatively with said lower bearing surfaces to locate said load-carrying module in a low position, and rigidly joining said modules together with said load-carrying module in said high position to form a frame for vehicles having a relatively high load-carrying surface and rigidly joining the modules together with said load-carrying module in said low position to form a frame for vehicles having a relatively low load-carrying surface.

7. The method as defined in claim 6 wherein said structural beams of said front module are formed in the configuration of a relatively deep open-top channel having a relatively narrow lower portion and a relatively wide top portion, and wherein said structural beams of said load-carrying module are formed in the configuration of a relatively shallow open-top channel dimensioned to be received in nesting relation within the wide top portion of said beams of said front module when assembled in said high position and to receive said narrow lower portion in nesting relation when assembled in said low position, said step of assembling said modules including the step of lowering one module to nest the structural beams thereof into the open-top of the structural beams of the other module, and rigidly joining the beams in the nested relation.

* * * * *